US005914717A

United States Patent [19]
Kleewein et al.

[11] Patent Number: 5,914,717
[45] Date of Patent: Jun. 22, 1999

[54] METHODS AND SYSTEM FOR PROVIDING FLY OUT MENUS

[75] Inventors: Robert Kleewein, Kirkland; William T. Flora, Seattle, both of Wash.

[73] Assignee: Microsoft, Redmond, Wash.

[21] Appl. No.: 08/505,398

[22] Filed: Jul. 21, 1995

[51] Int. Cl.$^6$ .................................................. G09G 5/08
[52] U.S. Cl. .......................... 345/352; 345/339; 345/473
[58] Field of Search .................................. 345/122, 145, 345/146, 156, 157, 121, 352, 353, 354, 328, 340, 347, 348, 339, 341, 342, 356, 473, 474

[56] References Cited

U.S. PATENT DOCUMENTS

| | | | |
|---|---|---|---|
| 5,196,838 | 3/1993 | Meier et al. | 345/118 |
| 5,204,947 | 4/1993 | Bernstein et al. | 345/146 |
| 5,331,335 | 7/1994 | Iida | 345/121 |
| 5,345,550 | 9/1994 | Bloomfield | 395/156 |
| 5,615,384 | 3/1997 | Allard et al. | 345/121 |

OTHER PUBLICATIONS

Now Utilities, 1991 pp. 4–1 to 4–5.
Automatic Drop Down List or Combination Boxes IBM Technical Disclosure Bulletin, Nov. 1992, p. 256.
"Contextual Animated—Open Window Control" IBM Technical Disclosure Bulletin, vol. 34. No. 11, pp. 68–69, Apr. 1992.
Trivette, Don, "The Magnificent Ninth Goes Multimedia," PC Magazine vol. 11 (3), Feb. 11, 1992, p. 451.
U.S. applicaton No. 08/340,267, Rubin et al, Nov. 15, 1994.

Primary Examiner—Dennis-Doon Chow
Attorney, Agent, or Firm—Jones & Askew, LLP

[57] ABSTRACT

A method and system are provided for displaying animations of menus solely in response to a cursor pointing in proximity to a menu marker that is displayed on a video display. Multiple menu markers may be displayed on the video display and each menu marker may be associated with a different menu. The animation may produce the visual effect of the menu sliding out of an associated menu marker. A dynamic control mechanism may be used to control the performance of the animation of the menu to account for different platforms and different processing states. In addition, audio output may accompany the animation of the menu.

31 Claims, 13 Drawing Sheets

METHODS AND SYSTEM FOR PROVIDING FLY OUT MENUS

TECHNICAL FIELD

The present invention relates generally to computer systems and, more particularly, to the display of menus in computer systems.

BACKGROUND OF THE INVENTION

Menus have become common features in user interface elements that are produced by computer systems. Menus generally include a number of menu items that a user may select to cause an associated operation to be performed. Menus were initially devised so as to be statically displayed as a permanent part of the user interface produced by a program. Unfortunately, such statically displayed menus may occupy a good deal of the available display space and when multiple menus are displayed, may cause the user interface to have a cluttered appearance. As a result of these disadvantages, pop-up menus were developed. Pop-up menus are drawn or "pop up" when a user requests that the menu be displayed by manipulating a cursor or selecting a command.

SUMMARY OF THE INVENTION

The present invention provides a new and visually appealing approach to displaying menus. In accordance with a first aspect of the present invention, a method is practiced in a computer system that has a video display and an input device for enabling a user to position a cursor on the video display. Per this method, a menu marker is provided on the video display. A user uses the input device to cause the cursor to be positioned to point in proximity to the menu marker. An animation of a menu that is associated with the menu marker is initiated solely in response to the cursor pointing in proximity to the menu marker. The animation may include successive frames that show successively greater portions of the menu with at least one of the frames showing all of the menu. Preferably, the menu remains displayed at the completion of the animation. In accordance with one embodiment of the present invention, the animation produces a visual effect of the menu sliding out of the menu marker. Multiple menu markers may be concurrently displayed on the video display, and a menu marker may be included as part of a menu.

In accordance with another aspect of the present invention, the computer system includes a video display and an input device for use by a user to position a cursor on the video display. The computer system further includes a menu with menu items and a menu marker for the menu. The computer system additionally includes an animation generator for generating an animation of the menu when the cursor points in proximity to the menu marker. The animation produces a visual effect such that the menu appears to slide out of the menu marker.

In accordance with an additional aspect of the present invention. A menu marker object is provided on the video display. The menu marker object is associated with a menu that has a menu bitmap that is divisible into elemental units. Performance of an animation of the menu that is associated with the menu marker object is initiated in response to a user using the mouse to position a mouse cursor to point at a current position that is in proximity to the menu marker object. The animation is performed on the video display within a predetermined time period. The animation is performed by first displaying a portion of the menu bit map that constitutes a first slice in a window on the video display. Then, a size of a second slice of the menu bit map is identified in elemental units. The size of the second slice is identified by determining how many slices may be displayed in a remaining portion of the predetermined time period assuming that it takes an amount of time to output each slice that is equal to how long it took to display the first slice. The second slice of the menu bit map is identified to be a portion of the bit map of the identified size that is adjacent to the first slice in a given direction. The first slice is scrolled in the window in a direction that is opposite to the given direction by an amount equal to the second slice. The second slice is then displayed immediately adjacent in a given direction to the first slice in the window on the video display such that the first slice of the second slice appear as a contiguous portion on the menu.

In accordance with a further aspect of the present invention, the computer system includes a video display for displaying an animation that includes successive frames. The computer system also includes a storage for storing a file that holds data to be used in creating the animation. A processor is provided in the computer system for executing a program that requests completion of performance of the animation within a fixed time period. The processor also executes instructions that perform the animation in response to the request from the program. These instructions include instructions for displaying consecutive portions of the video data held in the file in successive frames and instructions for dynamically determining for each successive frame how much video data that was not displayed in the immediately preceding frame used to be displayed in the successive frame based on how much time remains in the predetermined time period and how long it took to display the immediately preceding frame.

BRIEF DESCRIPTION OF THE DRAWINGS

A preferred embodiment of the present invention will be described below with reference to the following drawings.

DETAILED DESCRIPTION OF THE INVENTION

The preferred embodiment of the present invention provides a facility for generating "fly out menus." A "fly out" menu is one which, when displayed, appears to fly out or slide out of an object that is displayed on a video display. The visual effect of flying out of an object is produced by generating an animation of the menu so that the menu appears to incrementally fly out of a titlebar of the menu by drawing successively larger portions of the menu in consecutive frames until the entire menu is displayed. By displaying the menu markers consistently on the user interface rather than the menus, the preferred embodiment of the present invention helps to minimize the "visual noise" of having too many options on a user interface that is presented to a user.

The preferred embodiment of the present invention dynamically controls the amount of video output that is drawn during each frame of an animation of a fly out menu. The dynamic control mechanism helps to ensure that the animation is performed within a predetermined time period. The control mechanism utilizes empirical data to determine how long it is taking on the given platform in the present processing state to draw frames of the animation. The empirical data is used to adjust the granularity of video output that is drawn in each successive frame of the animation. This adjustment in the granularity of the video output for the animation makes it more likely that the animation is completed within the predetermined time period. Since an application program may be developed so as to assure that the animation will be completed within the predetermined time period, the application program developer can synchronize other events, such as the generation of audio output, with the performance of the animation.

Figure 1:
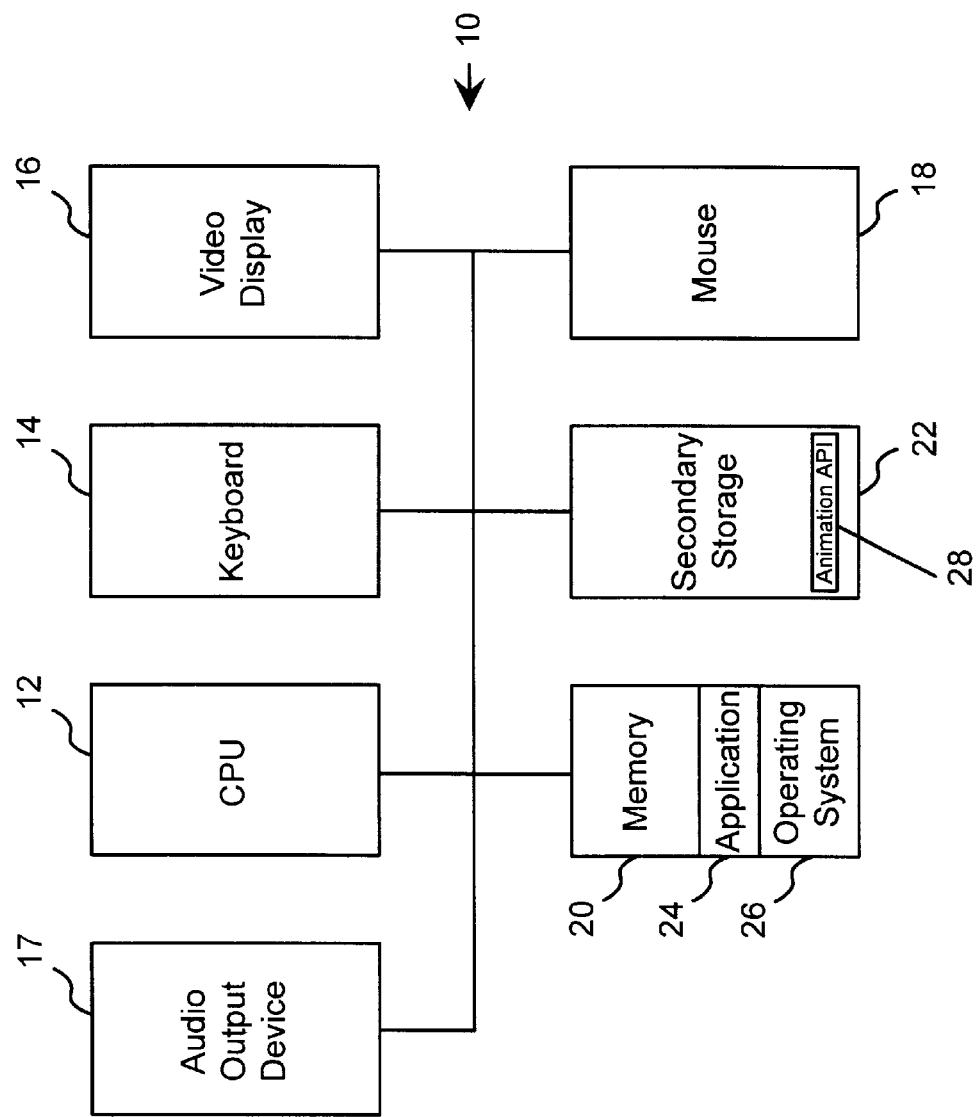
FIG. 1 is a block diagram of a computer system that is suitable for practicing the preferred embodiment of the present invention.

FIG. 1 shows a block diagram of a computer system 10 that is suitable for practicing the preferred embodiment of the present invention. Those skilled in the art will appreciate that the present invention may also be practiced in computer configurations that differ from that which is depicted in FIG. 1. The computer system 10 shown in FIG. 1 is a single processor system that includes a single CPU 12. Nevertheless, those skilled in the art will appreciate that the present invention may also be practiced in a distributed system having multiple processors.

The computer system 10 has a number of peripheral devices including a keyboard 14 and mouse 18 for receiving user input. In addition, the computer system 10 includes output peripheral devices, such as video display 16 for displaying video output and audio output device 17 for generating audio output. The computer system 10 also includes a primary memory 20 and a secondary storage 22 for storing programs and data. In the preferred embodiment of the present invention, the secondary storage 22 is an optical disk drive that includes an optical disk storage medium. Those skilled in the art will appreciate that other types of secondary storage, such as magnetic disk drives, may be utilized with the present invention. The primary memory 20 holds a copy of an application program 24 and a copy of an operating system 26. The application program 24 has one or more fly out menus that it wishes to display. The operation program 24 provides the bitmaps or other representations for the fly out menus. For purposes of the discussion below, it will be assumed that the operating system 26 is the "MICROSOFT" "WINDOWS" 95 operating system from Microsoft Corporation of Redmond, Wash.

The application program 24 includes an animation application program interface (API) 28 that provides dynamic control and feedback for the animation of menus in the preferred embodiment of the present invention. The application program 24 may execute the animation API 28 as a function that performs a desired animation of a menu. Although the code for providing the control in the preferred embodiment of the present invention is an API that is included in the application program 24, those skilled in the art will appreciate that in alternative embodiments of the present invention, the code may alternatively be part of the operating system 26 and need not be structured as an API.

Figure 2:
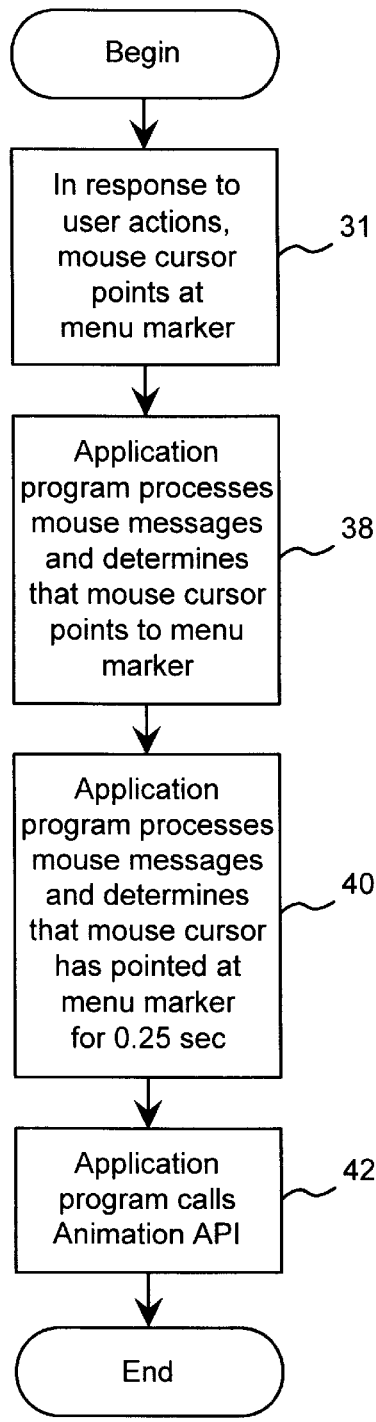
FIG. 2 is a flowchart illustrating the steps performed by the preferred embodiment of the present invention to display an animation of a fly out menu.
Figure 3A:
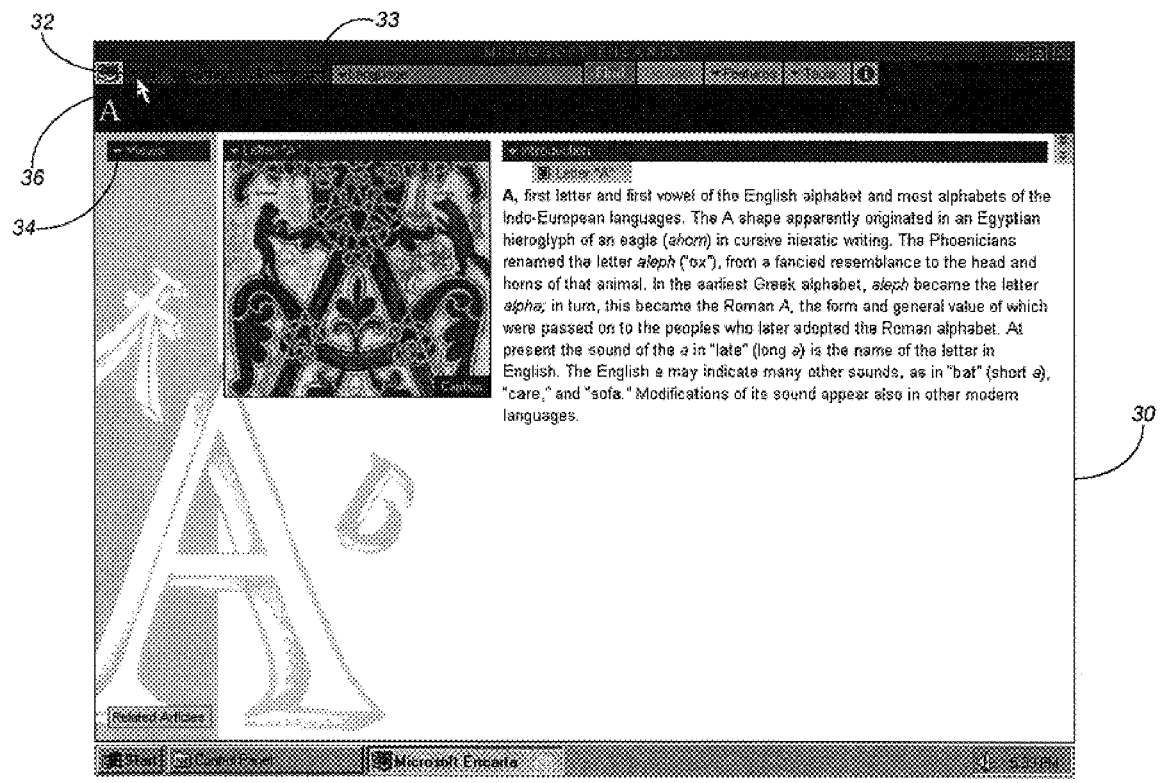
FIGS. 3A, 3B, 3C and 3D illustrate an example of a fly out menu animation in accordance with the preferred embodiment of the present invention.

The display of a fly out menu and the operation of the animation API 28 can perhaps best be explained by way of example. How the menu is used and the appearance of the menu will be described in more detail later. Suppose that the application program 24 calls the animation API 28 to display the animation of a fly out menu. FIG. 2 shows a flowchart of the steps that are performed in such an instance. Initially, a user uses the mouse 18 or another suitable device to manipulate a mouse cursor 36 (FIG. 3A) to point at a menu marker 32 (step 31 in FIG. 2). The menu marker 32 is a predefined object that a user may point at with the mouse cursor 36 to cause a fly out menu to be displayed. In the example shown in FIG. 3A, the window 30 produced by the application program 24 on the video display 16 includes other menu markers, such as menu marker 34. Each menu marker is associated with a corresponding menu. The menu marker 34 provides a visual cue that an object has a menu associated with it. Each menu marker has a consistent appearance (i.e., an arrowhead pointing in the direction in which the menu will fly out) so as to provide the user with a consistent user model.

The menu marker 32 is displayed in a window 33 that is generated by the application program 24. Each window has a separate window procedure associated with it. This window procedure is responsible for processing messages that are sent to it. Movements of the mouse 18 are reflected in mouse messages that are sent to the window procedure of the window to which the mouse cursor points. The mouse messages specify the status of mouse buttons and the position of the mouse cursor 36 within the window. The position of the mouse cursor 36 within the window is specified in (X, Y) coordinates relative to the upper left-hand corner of the window. Hence, in step 38 in FIG. 2, the application program 24 processes mouse messages and determines that the mouse cursor 36 points to a predetermined "hot region" of the menu marker 32. The "hot region" of the menu marker is larger than the menu marker so that the user need not point exactly at the menu marker but rather need only point a position that is close to the menu marker. In the preferred embodiment of the present invention, the hot region encompasses a rectangular region of locations surrounding the menu marker in close proximity. The application program knows where the menu marker is positioned within the window and knows the coordinates of the mouse cursor hot spot (i.e., the spot to which the cursor points) relative to the upper left-hand corner of the window. Using these two pieces of information, the application program 24 determines that the mouse cursor 36 points to the hot region of the menu marker 32.

The fly out menu animation is not initiated immediately; rather, the mouse cursor 32 must remain pointing at the menu marker for at least a predetermined period of time.

This delay prevents the animation from being initiated when a user inadvertently passes the mouse cursor 36 over the menu marker 32. After the expiration of the predetermined period of time, the fly out menu animation is initiated. In this example, the application program processes the mouse messages and determines that the mouse cursor 36 has pointed at the menu marker 32 for 0.25 seconds (step 40 in FIG. 2). Those skilled in the art will appreciate that the 0.25 time period is merely illustrative and that other time periods may be used in practicing the present invention. If the mouse cursor 36 does not remain pointing at the menu marker 32 for at least 0.25 seconds, the animation of the fly out menu is not initiated. On the other hand, when the mouse cursor 36 remains pointing at the menu marker 32 for 0.25 seconds, the fly out menu animation is initiated by the application program 24 calling the animation API 28 (step 42 in FIG. 2) This time frame is adjusted by the application developer. There is no requirement that the user click or double click a section on the mouse 18 to initiate the animation of the fly out menu. Some users, especially novice users, have difficulty performing such clicking and double clicking operations. Nevertheless, it should be appreciated that the menus may be configured such that the animations of the menus are displayed only when the user clicks anywhere on the titlebar.

Those skilled in the art will appreciate that the present invention may also be practiced using other input devices. For example a user may navigate the mouse cursor or perform selections using the keyboard 14 or another type of input device. For example, the arrow keys on the keyboard 14 may be used for navigation.

Figure 3B:
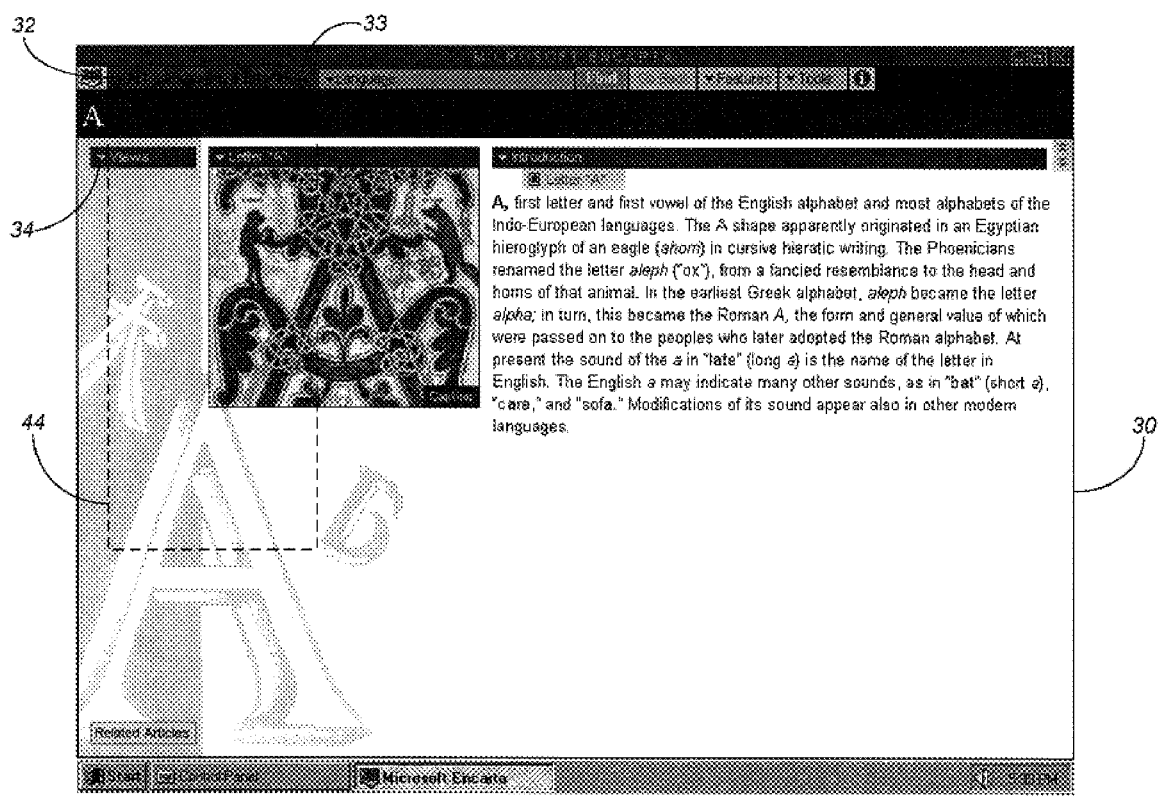

FIG. 3B shows an example of a window 44 to which the animation of the menu associated with menu marker 32 is to be displayed. The size of the window 44 matches the size of the complete menu. The window 44 extends from the edge of titlebar 33 ("Art, Language and Literature") that holds the menu marker 32 in the direction indicated by the arrow of the menu marker. This window 44 has no visible borders and generally is invisible to a viewer of the window 30 on the video display 16. The application program 24 is responsible for creating the window 44.

Figure 3C:
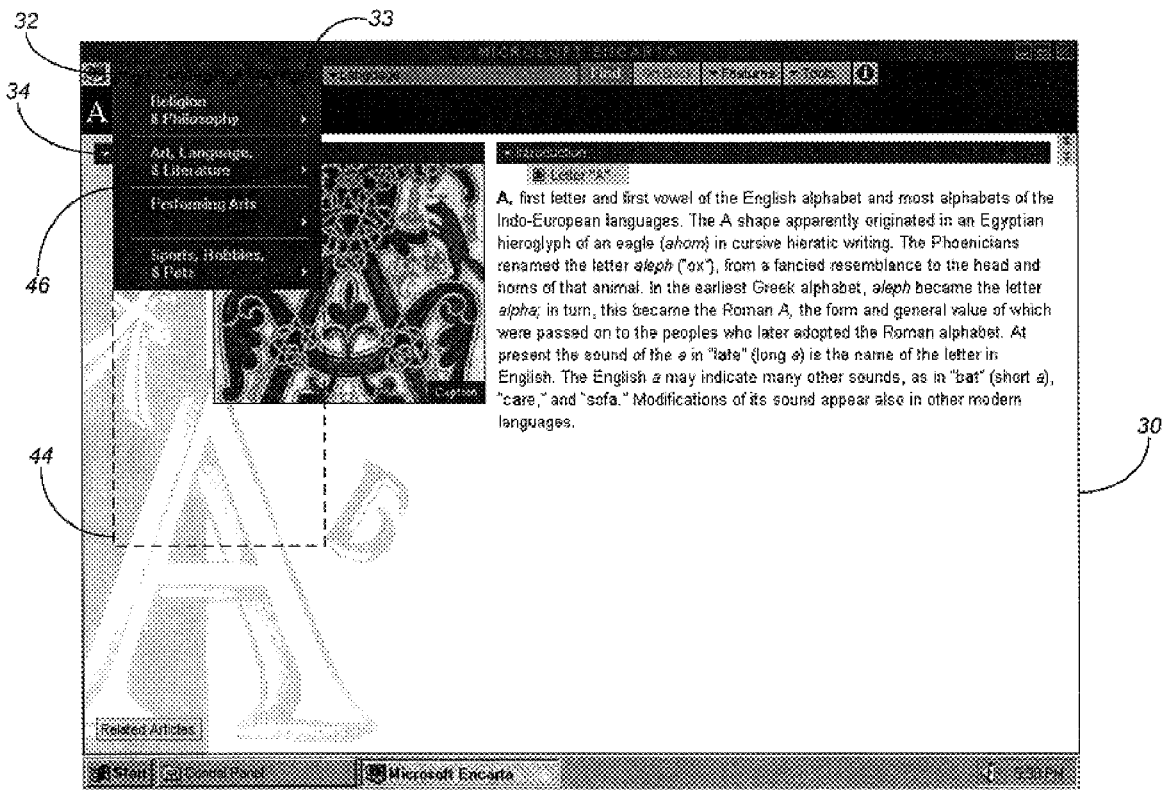
Figure 3D:
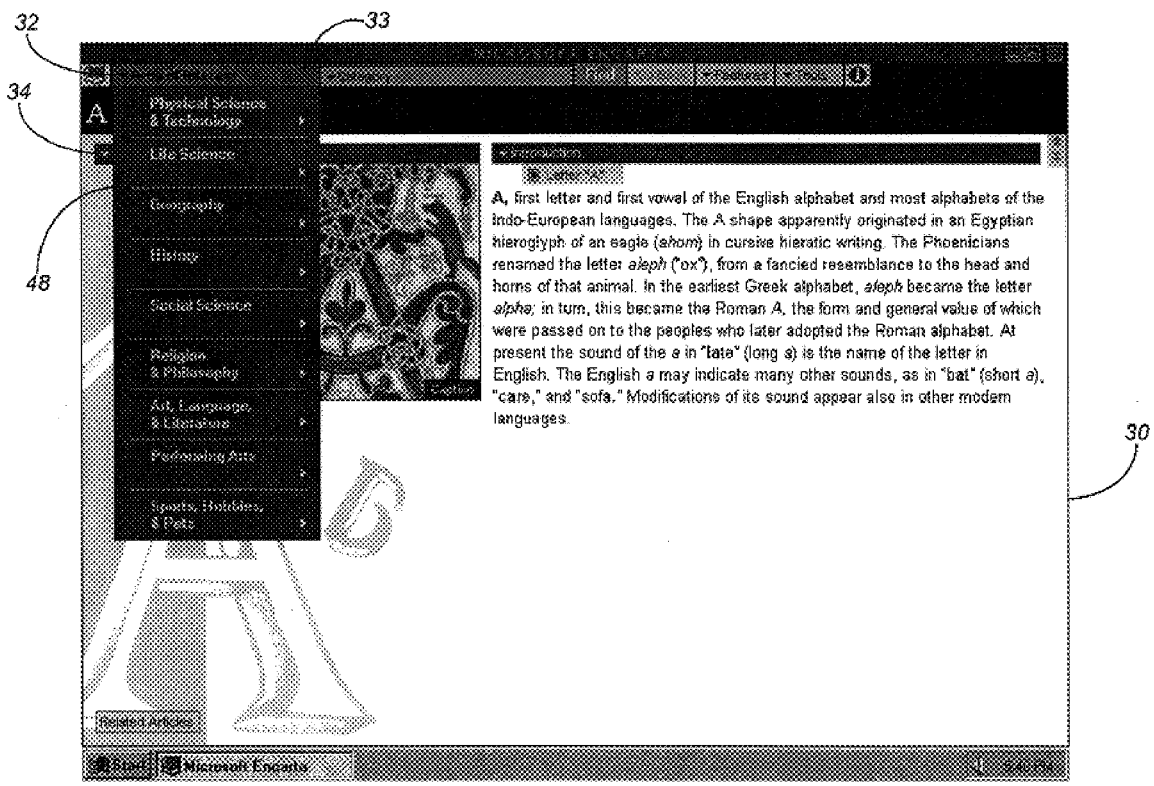

As will be described in more detail below, the animation is performed by drawing consecutive slices of the menu in the window 44 in conjunction with scrolling the preceding slices of the menu that have already been displayed in the window 44. FIG. 3C shows an example wherein a portion 46 of a menu is displayed during the animation that is initiated by positioning the mouse cursor 36 over menu marker 32. FIG. 3D shows the entire menu 48 when animation is completed.

It should be appreciated that fly out menus may fly out of a titlebar in a number of different directions, including above the titlebar, below the titlebar, or to either side of the titlebar. Those skilled in the art will appreciate that the present invention is not limited to instances wherein the fly out menus fly out of the titlebar in more or fewer directions than the four specified by the preferred embodiment of the present invention. It should also be appreciated that fly out menus may be nested such as the example shown in FIG. 4. In this example, a menu item 50 "Sports, Hobbies, & Pets" includes a menu marker 52 for a fly out menu 54 is displayed when the mouse cursor 36 points at menu marker 52. This example also illustrates an instance wherein the menu flies out of the side of the titlebar.

In the preferred embodiment of the present invention, the animation API 28 is called by passing it four input parameters. The first input parameter is a pointer to a bitmap that holds source data for the animation. Specifically, the bitmap holds the video data that is used by the animation API 28 to generate the animation. Those skilled in the art will appreciate that the video data need not be held in bitmap form but may also be held in metafiles or other formats for representing video data. The second input parameter is a handle to a window into which the animation will be drawn. The handle is a numerical identifier that uniquely identifies the window within the system. This window will be described in more detail below. A third input parameter is the direction of animation within the window. As will be described in more detail below, the animation may be performed upwards, downwards, to the left or to the right relative to a marker on the video display 16. The final input parameter is the total elapsed time in which to perform the animation.

Figure 5:
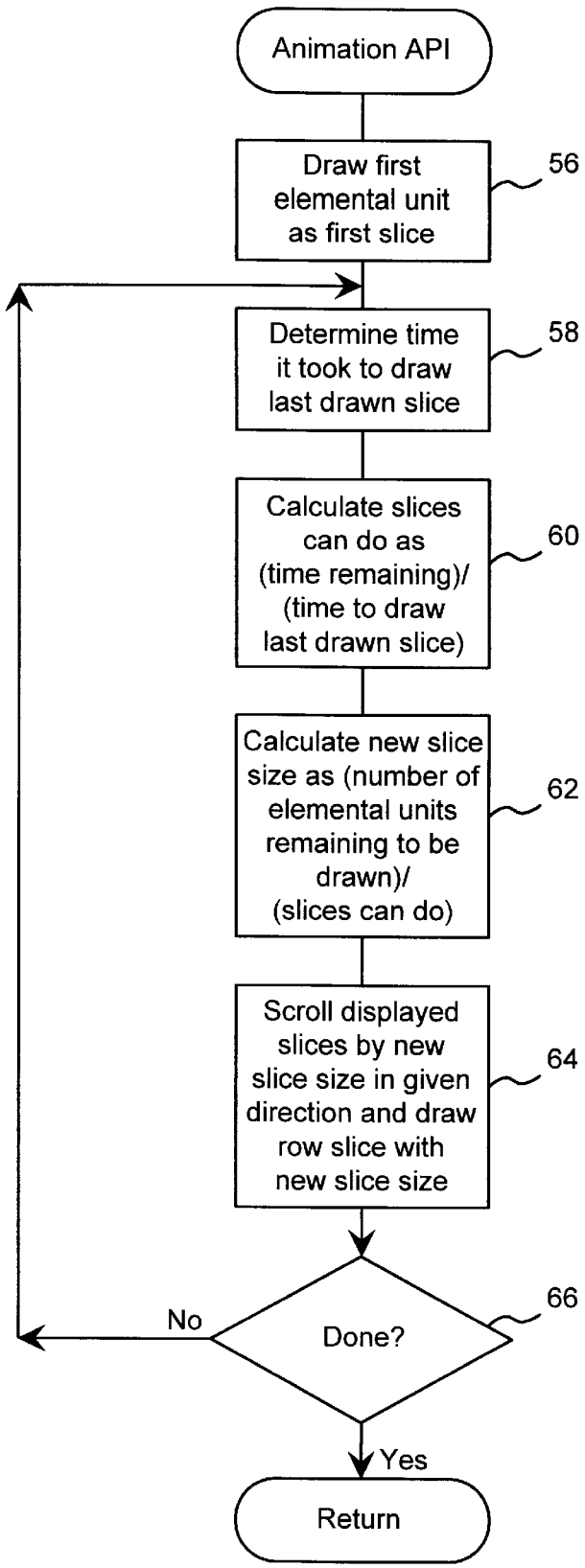
FIG. 5 is a flowchart illustrating the steps that are performed to display slices of a bitmap by an animation API in accordance with the preferred embodiment of the present invention.

FIG. 5 is a flow chart that illustrates the steps performed by the animation API 28 to display and control the animation of a fly out menu. The animation API 28 initially draws an elemental unit as a first slice of the animation (step 56). What constitutes a "elemental unit" depends upon the direction in which the menu is to "fly out." If the menu is to fly out above or below a titlebar, the elemental unit is a single row of pixels. Whether the bottom most row of pixels or the topmost row of pixels in the bitmap that was identified by the input parameter is the "first" elemental unit depends upon the direction in which the menu is to "fly out." When the menu flies out below the titlebar, the bottom most row of the menu bitmap is the first elemental unit. In contrast, when the menu is to fly out above the titlebar, the first elemental unit is the topmost row of pixels in the bitmap for the menu.

When the menu is to fly out of either of the sides of the titlebar, the elemental unit is a column of pixels. When the menu is to fly out of the right-hand side of the titlebar (as viewed by a viewer), the first elemental unit is the right-hand mouse column of pixels in the bitmap for the menu. Conversely, when the menu is to fly out of the left-hand side of the titlebar, the first elemental unit is the left-hand mouse column of pixels in the bitmap of the menu.

The animation API 28 then determines the time it took to draw the last drawn slice (step 58). In this case, the last drawn slice was the first elemental unit. Thus, an empirical value is used to determine how long it is taking to draw a slice of the bitmap of the menu. This empirical value compensates for the current processing state and platform on which the animation is being performed. The animation API 28 performs a number of calculations. In particular, the animation API 28 calculates the number of slices of the bitmap that it can output in the time remaining in the predetermined time period ("slices can do") that is set by the input parameter (step 60). This number of slices is calculated by dividing the time remaining by the time it took to draw the last drawn slice. The integer portion of the resulting calculation constitutes the number slices that can be drawn.

The animation API 28 next calculates the appropriate size for the new slice that is to be drawn when the window 44 is repainted. The animation is performed by redrawing the window 44 to add new slices to those that are already displayed in the window. Each redrawing of the window 44 constitutes a frame of the animation. The size of the new slice is calculated by dividing the number of elemental units that remain to be drawn by the number of slices that can be drawn in the time remaining (step 62). The slices that are already displayed in the window 44 are scrolled in the direction to which the menu marker points by an amount equal to the new slice size dimension in a given direction. The new slice is drawn in the area of the window 44 out of which the previously drawn slices were scrolled (step 64).

Slices consist of an integral number of elemental units and are selected sequentially to ensure the proper appearance of the menu as it flies out. The animation API 28 then checks to see whether it is done (step 66) by determining whether there are any portions of the menu bitmap that remain to be displayed or by the predetermined time period expiring. If the animation API is not done, the above-described steps are repeated beginning with step 58.

Figure 6A:
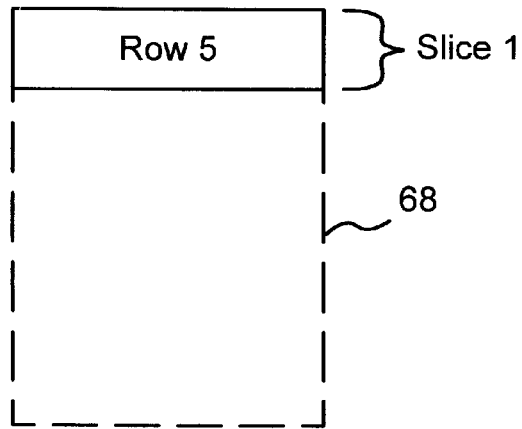
FIGS. 6A, 6B and 6C depict an example of how slices of a bitmap are displayed in practicing the preferred embodiment of the present invention.
Figure 6B:
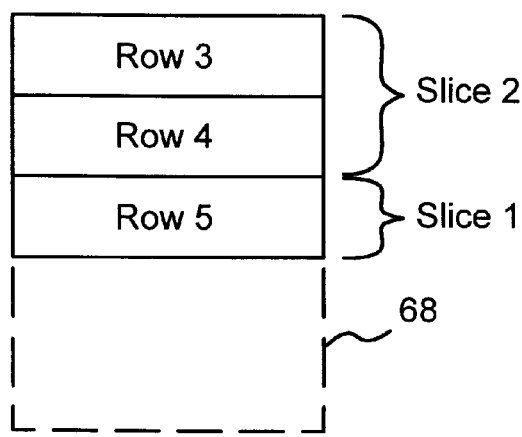
Figure 6C:
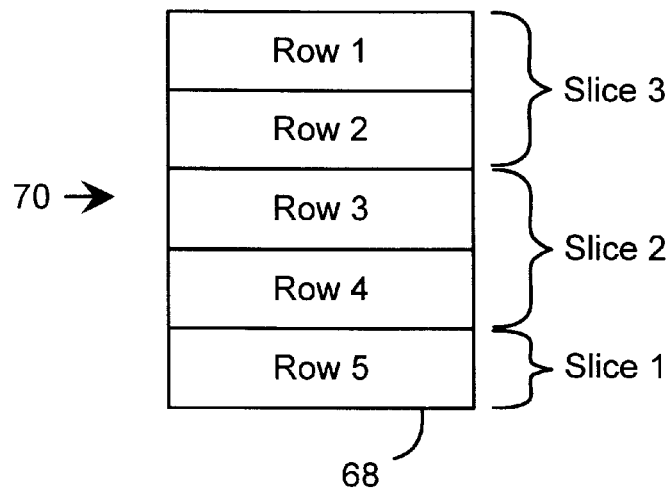

FIGS. 6A, 6B, and 6C show an example of how the animation API 28 displays slices of a menu bitmap that includes five rows. The example in FIGS. 6A, 6B, and 6C assumes that the menu is to fly out in a downward direction and that the time period in which to complete the animation is three seconds in length. In FIG. 6A, the first elemental unit, row 5, is drawn in window 68. It takes one second to draw row 5 in window 68. Thus, the animation API 28 determines that there are two seconds remaining to draw four rows. The animation API 28 also knows that empirically it takes one second to draw a slice. Thus, the animation API 28 determines that the next slice should include two rows. The next two rows are rows 4 and 3. These two rows constitute slice 2. FIG. 6B shows an example of the appearance of the next frame in the animation sequence for the menu. Slice 1, consisting of row 5, is scrolled downward by two rows and rows 4 and 3 are displayed in sequence as slice 2 in positions immediately above row 5. The scrolling may be performed by calling the ScrollWindow( ) or ScrollDC( ) functions, such as found in the Win 32 API set found in the "MICROSOFT" "WIDOWS" 95 operating system. Thus, in FIG. 6B the granularity of video data that is added to the second frame in the animation is increased to ensure that the animation is completed within the designated time frame.

In the next iteration performed by the animation API 28, the animation API determines that it has one second remaining and that it takes one second to display a slice. Accordingly, slice 3 is determined to include rows 2 and 1. Slices 1 and 2 are scrolled by an amount equal to the number of rows in slice 3 and slice 3 is drawn as shown in FIG. 6C. As a result, the entire bitmap 70 of the menu is displayed within the window 68.

Figure 7:
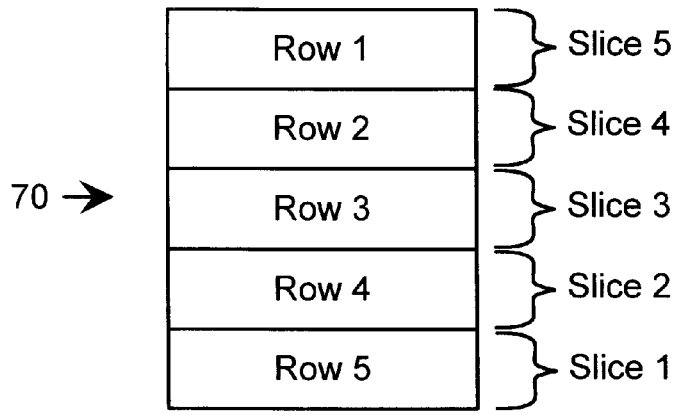
FIG. 7 illustrates a different granularity of slices for a second example of the animation of a bitmap in accordance with the preferred embodiment of the present invention.

The animation API 28 may determine the slices differently for the same animation when called again on the same computer system. For example, suppose that the bitmap 70 is passed as a parameter in an animation that is to fly downward but the time period for completion of the animation is 2.5 seconds rather than 3 seconds. Further suppose, that the machine state has changed so that it only takes 0.5 seconds to draw a slice. In such an instance, the bitmap 70 may be divided into slices as shown in FIG. 7 such that each slice is one row of pixels in size. It should be appreciated that the slice size may change more than once during the course of performance of an animation. The preferred embodiment of the present invention compensates for the change in processing state to ensure that the animation is completed within the designated time frame. The preferred embodiment of the present invention calculates the estimated time for drawing a slice based upon the last drawn slice.

The above examples have focused exclusively on instances wherein the elemental units are, rows of pixels. As was mentioned above, the elemental units may be columns as well. In such instances, the slices are integral numbers of columns of pixels.

Figure 8:
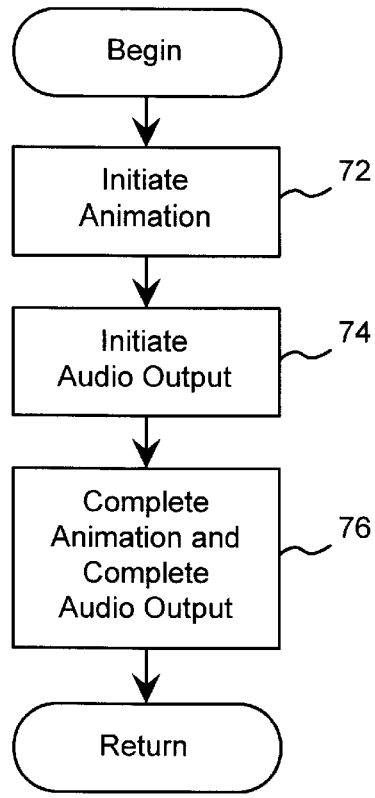
FIG. 8 is a flowchart illustrating the steps that are performed to output audio output in conjunction with an animation in the preferred embodiment of the present invention.

One of the benefits of increasing the likelihood that the animation is completed within a given time frame is that events may be synchronized with the animation. One such type of event is the outputting of audio output. In the abovedescribed embodiment, each fly out menu has a same sound that accompanies the animation of the menu. The sound resembles a "swoosh" sound. In general, the animation is initiated (step 72 in FIG. 8) and the audio output is initiated contemporaneously (step 74). The animation and audio output are thus synchronized and performed until completed (step 76). The audio output may, in an alternative embodiment, be turned off so that no audio output accompanies the animation of the menu.

Figure 9:
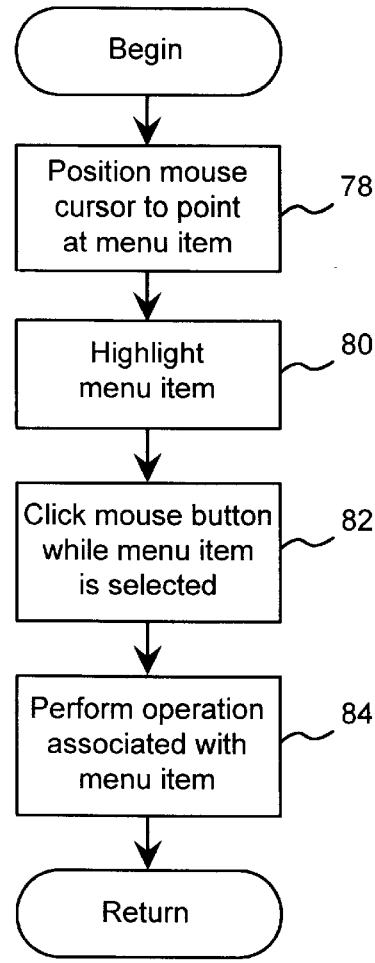
FIG. 9 is a flowchart illustrating an example of steps that are performed to use fly out menus in the preferred embodiment of the present invention.

Once the animation of the fly out menu is complete, the menu remains displayed until the user moves the mouse cursor 36 so that it no longer points at the menu marker 34 and no longer points to a position within the fly out menu. The fly out menu also is no longer displayed when a user makes a selection. FIG. 9 is a flowchart that illustrates typical steps that are performed when the user utilizes a fly out menu. Initially, the user uses the mouse 18 to position the mouse cursor 36 to point at one of the menu items within the fly out menu (step 78). The menu item that is selected by the user positioning the mouse cursor to point at the menu item is highlighted (step 80). FIG. 5 shows an example wherein the "Sports, Hobbies & Pets" menu item is selected and highlighted. The highlighting color depends upon the background color of the menu. It is at the discretion of the application developer to select the background color and the highlight color for the menu. In general, colors are provided with dark and light counterparts such that the counterpart of the background color of the menu is used to highlight menu items. For example, if the menu has a background color of dark blue, a light blue counterpart may be used to highlight the menu item. The color of the text within a menu item may also be of different colors as selected by the application developer.

Figure 4:
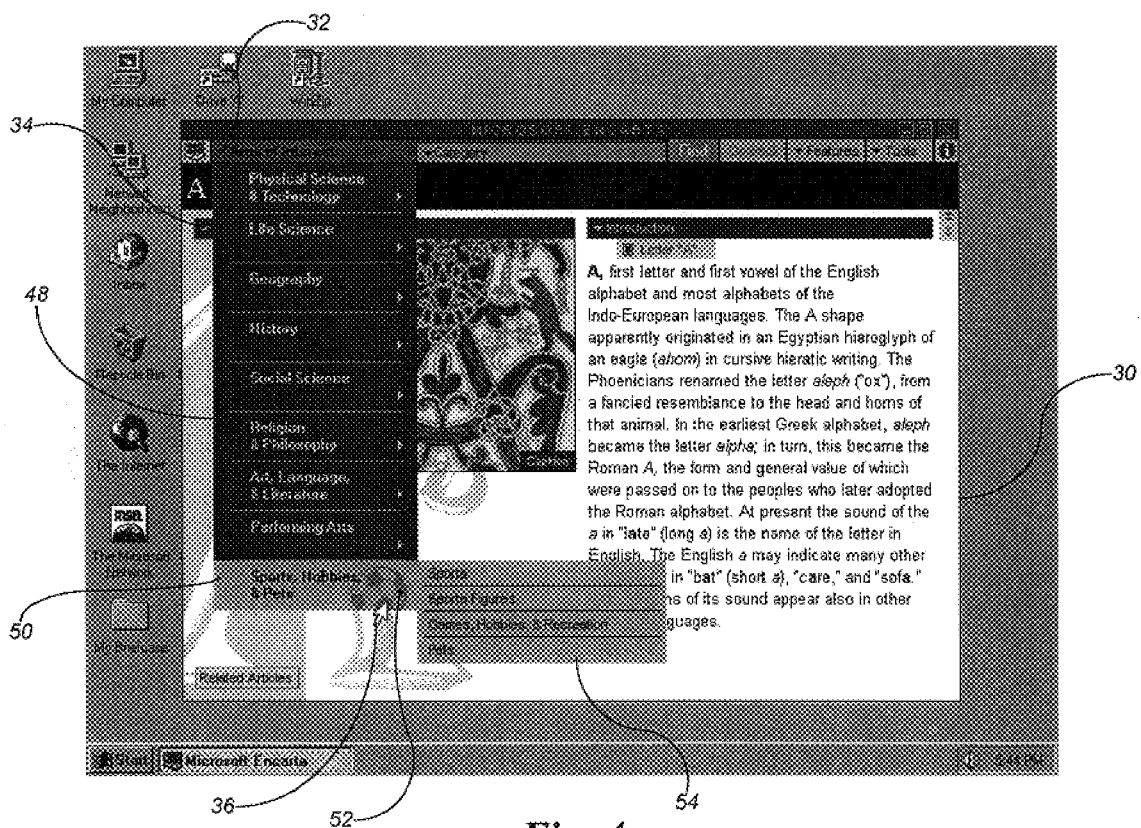
FIG. 4 illustrates an example of a nested fly out menu in accordance with the preferred embodiment of the present invention.

The highlighted menu item 50 shown in FIG. 4 also illustrates that menu items may include text as well as graphics. In the example shown in FIG. 4, the highlighted menu items includes text and a graphical representation of a soccer ball. In many conventional systems, in contrast, menu items are limited to text only.

After a user has positioned the mouse cursor to select an item that is highlighted, a user typically clicks a mouse button over a selected menu item as an indication that the user wishes the operation associated with the selected menu item to be performed (step 82). When user clicks the mouse, the operation that is associated with the menu item is then performed (step 84).

While the present invention has been described with reference to a preferred embodiment thereof, those skilled in the art will appreciate the various changes in form the detail may be made without departing from the intended scope of the present invention as defined in the appended claims. For example, the present invention is not limited to instances where the slices are solely rows or columns. There may be instances wherein the video data may be partitioned in regularly shaped slices. Moreover, the present invention is not limited to practice in a windows-based environment; rather, it is applicable more generally to instances wherein an animation is to be drawn in a predefined area. Still further, the present invention is not intended to be limited to the use of scrolling. In alternative embodiments, slices of video data may be moved or manipulated by other means.

We claim:

1. In a computer system having a video display and an input device for enabling a user to position a cursor on the video display, a method comprising the computer-implemented steps of:

providing a menu marker on the video display;

in response to the user using the input device, positioning the cursor to point in proximity to the menu marker; and in response to the cursor pointing in proximity to the menu marker, initiating an animation that produces a visual effect of a menu sliding out of the menu marker, the animation comprising the display of successive frames showing successively greater portions of video data representing the menu, at least one of the frames showing all of the video data and the number of frames displayed being based on a predetermined period of time for displaying all of the video data.

2. The method of claim 1 wherein the step of providing the menu marker comprises the step of providing the menu marker on the video display with a visual indicator of a direction in which the menu appears to slide out of the menu marker.

3. The method of claim 1 wherein the menu includes menu items having both text and graphics.

4. The method of claim 1 wherein the cursor must remain pointing in proximity to the menu markers for a non-negligible period of time before the animation of the menu is initiated.

5. The method of claim 1, further comprising the step of initiating audio output to accompany the animation of the menu.

6. The method of claim 1 wherein the menu remains displayed on the video display upon completion of the animation of the menu.

7. The method of claim 6 wherein the menu includes menu items and where in the method further comprises the steps of:

in response to the user using the input device, repositioning the cursor to point at a selected one of the menu items; and in response to the cursor pointing at the selected menu item, highlighting the selected menu item on the video display.

8. The method of claim 6, further comprising the steps of:

in response to the user using the input device, repositioning the cursor to point at a location that is not part of the menu and that is not in proximity to the menu marker; and in response to the repositioning of the cursor, terminating the display of the menu on the video display.

9. The method of claim 1 wherein the menu includes an additional menu marker that may be used to initiate an animation of an additional menu.

10. In a computer system having a video display that displays a cursor, a method comprising the computer-implemented steps of:

providing an animation engine;

providing an application program that is run on the computer system;

with the application program, displaying a menu marker for an associated menu on the video display;

in response to the cursor pointing in proximity to the menu marker, calling the animation engine to perform an animation that produces a visual effect of the associated menu sliding out of the menu marker, said application program providing a bitmap of the associated menu to the animation engine; and performing the animation of the associated menu with the animation engine, the animation comprising the display of successive frames showing successively greater portions of video data representing the associated menu, at least one of the frames showing all of the video data and the number of frames displayed being based on a predetermined period of time for displaying all of the video data.

11. A computer system comprising:

a video display;

an input device for use by a user to position a cursor on the video display;

a menu having menu items for display on the video display;

a menu marker for the menu, said menu marker being displayed on the video display on a titlebar; and an animation generator for generating an animation of the menu for display on the video display in response to the cursor pointing in proximity to the menu marker, said animation producing a visual effect such that the menu appears to slide out of the titlebar, said animation comprising the display of successive frames showing successively greater portions of video data representing the menu, at least one of the frames showing all of the video data and the number of frames displayed being based on a predetermined period of time for displaying all of the video data.

12. The computer system of claim 11, further comprising an additional menu and an additional menu marker for the additional menu.

13. The computer system of claim 11, further comprising a highlight generator for highlighting the menu items of the menu when the cursor points at the menu items.

14. The computer system of claim 11, further comprising an audio output generator for generating audio output to accompany the animator of the menu.

15. The system of claim 11 wherein the input device is a mouse.

16. In a computer system having a video display for displaying a window and a mouse for manipulating a position of a mouse cursor on the video display, said mouse cursor pointing to a current position on the video display, a method comprising the steps of:

providing a menu marker object on the video display, said menu marker object being associated with a menu having a menu bitmap that is divisible into elemental units;

in response to a user using the mouse to position the mouse cursor to point to a current position that is in proximity to the menu marker object, initiating performance of an animation of the menu that is associated with the menu marker object on the video display; and performing the animation on the video display in a predetermined time period comprising the steps of:

displaying a portion of the menu bitmap constituting a first slice of the menu bitmap in the window on the video display, identifying a size of a second slice of the menu bitmap in the elemental units by determining how many slices may be displayed in a remaining portion of the predetermined time period if it takes an amount of time to output each slice equal to how long it took to display the first slice, identifying the second slice of the menu bitmap to be a portion of the bitmap of the identified size that is adjacent to the first slice in a given direction, scrolling the first slice in the window in a direction that is opposite to the given direction by an amount equal to the second slice, and displaying the second slice immediately adjacent in the given direction to the first slice in the window on the video display so that the first slice and the second slice appear as a contiguous portion of the menu.

17. The method of claim 16 wherein the mouse cursor points to the current position that is in proximity to the menu marker object for a non-negligible period of time before initiating performance of the animation of the menu.

18. The method of claim 16 further comprising the step of initiating audio output to accompany the animation of the menu.

19. The method of claim 16 wherein the menu remains displayed on the video display upon completion of the animation of the menu.

20. The method of claim 19 wherein the menu includes menu items, the method further comprising the steps of:
   in response to use of the mouse, repositioning the mouse cursor to point at a selected one of the menu items; and
   in response to the mouse cursor pointing at the selected menu item, highlighting the selected menu item on the video display.

21. The method of claim 19, further comprising the steps of:
   in response to movement of the mouse, repositioning the mouse cursor to point at a location that is not part of the menu and that is not in proximity to the menu marker object; and
   in response to the repositioning of the mouse cursor, terminating the display of the menu on the video display.

22. The method of claim 16, wherein the menu includes another menu marker object associated with initiation of an animation of an additional menu.

23. A computer system comprising:
   a video display for displaying an animation that includes successive frames;
   a storage for storing a file holding video data for creating the animation; and
   a processor for executing:
      a program that requests completion of performance of the animation within a time period, and
      instructions that perform the animation in response to the request from the program, said instructions including:
         instructions for displaying consecutive portions of the video data held in the file in successive frames, and
         instructions for dynamically determining for each successive frame how much video data that was not displayed in an immediately preceding frame is to be displayed in the successive frame based on how much time remains in the predetermined time period and how long it took to display the immediately preceding frame.

24. The computer system of claim 23, further comprising an audio output device for generating audio output.

25. The computer system of claim 24, further comprising a synchronization mechanism for synchronizing outputting of audio output on the audio output device with performance of the animation.

26. The computer system of claim 23 wherein the video data represents a menu.

27. The computer system of claim 23, further comprising:
   a pointing device for manipulating a cursor on the video display that points to positions on the video display;
   a trigger object generator for generating a trigger object on the video display; and
   an animation trigger for triggering performance of the animation when the cursor points to the trigger object on the video display.

28. The computer system of claim 27, wherein the video data represents a menu.

29. The computer system of claim 28, wherein the processor further executes instructions for retaining the menu on the video display upon completion of the animation.

30. The computer system of claim 29 wherein the menu includes menu items and wherein the processor further executes instruction for:
   in response to movement of the pointing device, positioning the cursor to point at a selected one of the menu items; and
   in response to the cursor pointing at the selected menu item, highlighting the selected menu item on the video display.

31. The computer system of claim 29, wherein the processor further executes instructions for:
   in response to movement of the pointing device, positioning the cursor to point at a location that is not part of the menu and that is not in proximity to the trigger object; and
   in response to the positioning of the cursor, terminating the display of the menu on the video display.

* * * * *